US012616180B2

(12) United States Patent
Kawamura et al.

(10) Patent No.: US 12,616,180 B2
(45) Date of Patent: May 5, 2026

(54) FISHING ROD HANDLE MEMBER AND FISHING ROD

(71) Applicant: GLOBERIDE, Inc., Higashikurume (JP)

(72) Inventors: Takuji Kawamura, Higashikurume (JP); Kazuki Kawai, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 18/684,323

(22) PCT Filed: Oct. 14, 2022

(86) PCT No.: PCT/JP2022/038345
§ 371 (c)(1),
(2) Date: Feb. 16, 2024

(87) PCT Pub. No.: WO2023/079925
PCT Pub. Date: May 11, 2023

(65) Prior Publication Data
US 2024/0349710 A1      Oct. 24, 2024

(30) Foreign Application Priority Data

Nov. 5, 2021      (JP) ................................. 2021-181143

(51) Int. Cl.
*A01K 87/08*            (2006.01)
(52) U.S. Cl.
CPC .................................... *A01K 87/08* (2013.01)
(58) Field of Classification Search
CPC ................................ A01K 87/06; A01K 87/08
(Continued)

(56) References Cited

U.S. PATENT DOCUMENTS 4,222,192 A * 9/1980 Jacobson ............... A01K 87/08
                                                      43/22
4,607,975 A * 8/1986 Lo .......................... A01K 87/06
                                                      43/18.5
(Continued)

FOREIGN PATENT DOCUMENTS

JP        H11-137132 A      5/1999
JP        3102305 U        7/2004
(Continued)

OTHER PUBLICATIONS

Dec. 20, 2022 International Search Report issued in International Patent Application No. PCT/JP2022/038345.
(Continued)

*Primary Examiner* — Joshua J Michener
*Assistant Examiner* — Nicole Paige Maccrate
(74) *Attorney, Agent, or Firm* — Oliff PLC

(57)            ABSTRACT

A fishing rod handle member including a fishing rod reel seat and a fishing rod grip, that is lightweight, that makes it difficult for vibration from a rod body to attenuate, and that can hold strength without reinforcing an end of the grip with a separate member, and a fishing rod equipped therewith. In a fishing rod handle member, a reel seat main body in which a reel leg placement portion on which a reel leg is placed is formed and a grip connected to the reel seat main body are integrally molded, and the grip is connected to the reel seat main body at one end, and has a closed structure at the other end.

8 Claims, 10 Drawing Sheets

(58) Field of Classification Search
USPC ........................................ 43/20, 21.2, 22, 23
See application file for complete search history.

(56) References Cited

U.S. PATENT DOCUMENTS

| | | | | |
|---|---|---|---|---|
| 4,920,682 | A | | 5/1990 | Andreasen et al. |
| 5,396,727 | A | * | 3/1995 | Furuya ................... A01K 87/08 |
| | | | | D22/142 |
| 6,105,302 | A | * | 8/2000 | Yamamoto ............. A01K 87/08 |
| | | | | 43/23 |
| 2014/0090770 | A1 | | 4/2014 | Huang |
| 2015/0128475 | A1 | * | 5/2015 | Tate ................... B29D 99/0046 |
| | | | | 156/244.19 |
| 2015/0327526 | A1 | * | 11/2015 | Cooper .............. A01K 89/0192 |
| | | | | 43/25 |
| 2016/0121476 | A1 | * | 5/2016 | Techlin ................ A01K 87/085 |
| | | | | 16/426 |
| 2020/0383305 | A1 | * | 12/2020 | Iwata ..................... A01K 87/02 |
| 2021/0144983 | A1 | * | 5/2021 | Osoreda ........... A01K 89/01925 |
| 2021/0259228 | A1 | * | 8/2021 | Hutchins, Jr. ............ B25G 1/06 |
| 2023/0309524 | A1 | | 10/2023 | Kawamura |

FOREIGN PATENT DOCUMENTS

| | | | |
|---|---|---|---|
| JP | 2013-021923 | A | 2/2013 |
| JP | 2018-061448 | A | 4/2018 |
| WO | 2021/192431 | A1 | 9/2021 |

OTHER PUBLICATIONS

May 2, 2024 International Preliminary Report on Patentability issued in International Patent Application No. PCT/JP2022/038345.
Feb. 3, 2025 Examination Report issued in Australian Patent Application No. 2022382141.
Feb. 25, 2025 Office Action issued in Japanese Patent Application No. 2021-181143.
Jul. 20, 2025 Office Action issued in Chinese Application No. 202280058089.X.
Jan. 20, 2026 Notice of Preliminary Rejection issued in Korean Application No. 10-2024-7005424.

* cited by examiner

FISHING ROD HANDLE MEMBER AND FISHING ROD

CROSS REFERENCE

The present application claims priority based on Japanese Patent Application No. 2021-181143 (filed on Nov. 5, 2021), the contents of which are incorporated herein by reference in their entirety.

TECHNICAL FIELD

The present invention relates to a fishing rod handle member comprising a reel seat main body and a grip, and a fishing rod equipped therewith.

BACKGROUND ART

In the related art, various fishing rods including a fishing rod reel seat and a fishing rod grip have been known.

In such a fishing rod, usually, the fishing rod reel seat and the fishing rod grip are placed on a rod body, and a reel leg placement portion for placing a reel leg is formed on an upper side or a lower side of a main body of the fishing rod reel seat.

As such a fishing rod, for example, Patent Literature 1 discloses a fishing rod including: a rod body; a reinforcing resin layer having a cylindrical shape, which is provided on a peripheral surface of the rod body and at the outer periphery of which an uneven surface is formed; and a reel seat injection-molded on an outer peripheral surface of the reinforcing resin layer.

In addition, Patent Literature 2 discloses a fishing rod including a rear grip portion on a rear side of a reel seat including a reel seat main body having a cylindrical shape and including a reel leg placement portion on which a reel leg portion is placed, the fishing rod including: a rod main body; and a rear grip rod body in which the rear grip portion is integrally formed by increasing the diameter of a rear portion of a hollow rod body at a rate of change larger than the rate of change in the diameter of a rod main body when the hollow rod body is formed from a prepreg. A rear portion of the rod main body and a front portion of the rear grip rod body are integrally and externally overlapped, joined, and integrated to form an overlapping portion of a predetermined length, and at least a part of the overlapping portion is located inside the reel seat main body.

CITATION LIST

Patent Literature

Patent Literature 1: JP H11-137132 A
Patent Literature 2: JP 2013-21923 A

SUMMARY OF INVENTION

Technical Problem

However, in the fishing rod disclosed in Patent Literature 1, since the rod body is provided with the solid reel seat injection-molded on the outer peripheral surface of the reinforcing resin layer having a cylindrical shape, the weight is increased, and since the reel seat is thick, the reel seat functions as a cushioning material, whereby the sensitivity of the fishing rod decreases significantly, which is a problem.

In addition, in the fishing rod disclosed in Patent Literature 2 as well, since the rear grip rod body and the reel seat main body are joined to the rod main body, an increase in weight due to adhesion is unavoidable, and since an adhesion portion or a plurality of layers are interposed, the adhesion portion or the plurality of layers function as cushioning materials, whereby the sensitivity of the fishing rod decreases significantly, which is a problem.

The present invention has been made in view of the above-described circumstances, and an object of the present invention is to provide a fishing rod handle member comprising a fishing rod reel seat and a fishing rod grip, that is lightweight, that makes it difficult for vibration from a rod body to attenuate, and that can hold strength without reinforcing an end of the grip with a separate member, and a fishing rod equipped therewith. Other objects of the present invention will become apparent upon reference to the entirety of the present specification.

Solution to Problem

According to one embodiment of the present invention, there is provided a fishing rod handle member in which a reel seat main body in which a reel leg placement portion on which a reel leg is placed is formed and a grip connected to the reel seat main body are integrally molded. The grip is connected to the reel seat main body at one end, and has a closed structure at the other end.

In the fishing rod handle member according to one embodiment of the present invention, the closed structure is a wall member covering the other end of the grip.

In the fishing rod handle member according to one embodiment of the present invention, the wall member is formed to be perpendicular or inclined with respect to an extending direction of the grip.

In the fishing rod handle member according to one embodiment of the present invention, the reel seat main body and the grip are formed from carbon fiber-reinforced plastic. In addition, in the fishing rod handle member according to one embodiment of the present invention, carbon fibers of the carbon fiber-reinforced plastic are continuously formed in a longitudinal direction of the fishing rod handle member and along the closed structure.

In the fishing rod handle member according to one embodiment of the present invention, an end of a fishing rod body is attached to one end of the reel seat main body, which is an end located opposite to the grip. In addition, in the fishing rod handle member according to one embodiment of the present invention, the one end of the reel seat main body is formed in a hollow shape so as to attach the end of the fishing rod body.

In the fishing rod handle member according to one embodiment of the present invention, the reel seat main body and the grip are formed in a hollow shape or a solid shape except for one end of the reel seat main body and the other end of the grip.

In the fishing rod handle member according to one embodiment of the present invention, when the reel seat main body and the grip are formed in a solid shape except for the other end of the grip, the reel seat main body and the grip are formed in a solid shape using a foam member or a low-specific gravity resin.

According to one embodiment of the present invention, there is provided a fishing rod comprising: any of the fishing rod handle members described above; and a rod body.

Advantageous Effects of Invention

According to the embodiment, it is possible to provide the fishing rod handle member comprising the fishing rod reel seat and the fishing rod grip, that is lightweight, that makes it difficult for vibration from the rod body to attenuate, and that can hold strength without reinforcing the end of the grip with a separate member, and the fishing rod equipped therewith.

MODE FOR CARRYING OUT THE INVENTION

Hereinafter, an embodiment of a fishing rod according to the present invention will be specifically described with reference to the accompanying drawings. Components that are common in a plurality of the drawings will be denoted by the same reference signs throughout the plurality of drawings. It should be noted that each drawing is not necessarily drawn to an accurate scale for convenience of description.

Figure 1:
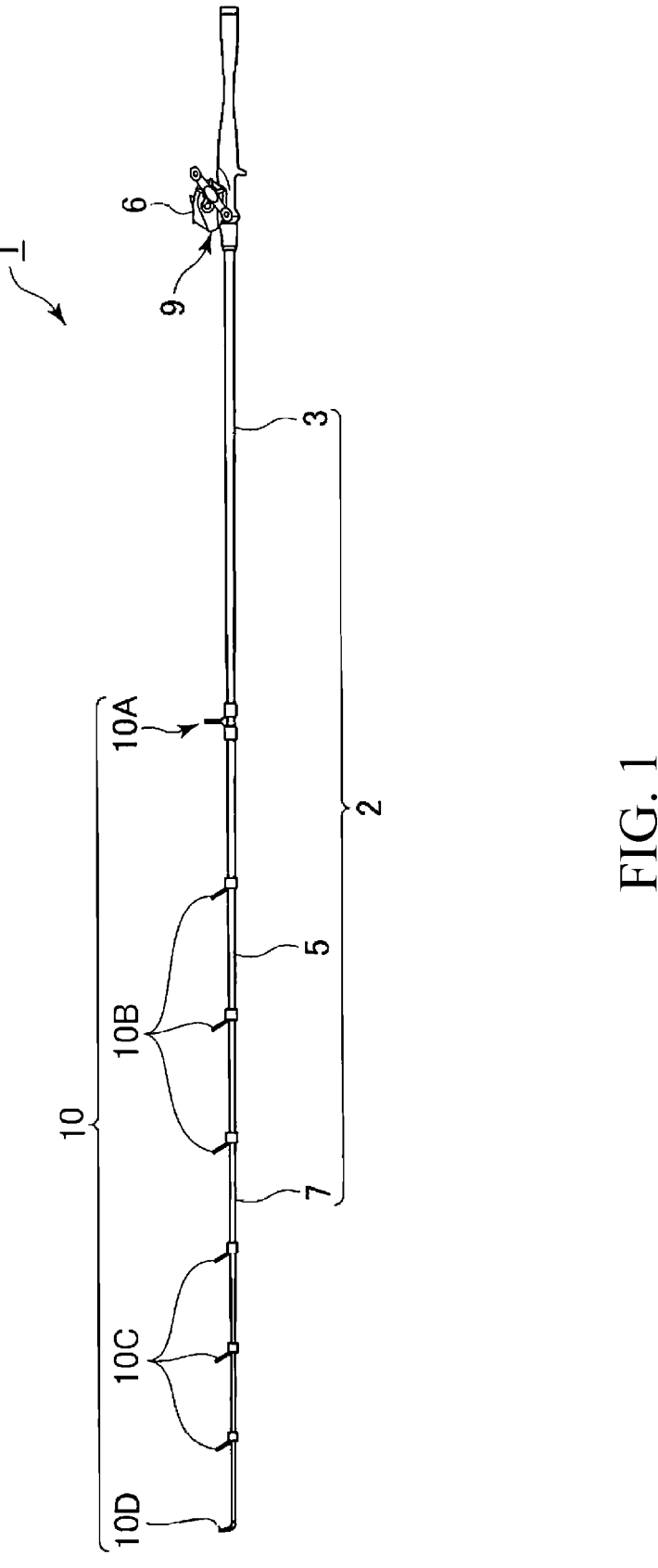
FIG. 1 is a view illustrating a fishing rod according to one embodiment of the present invention.

FIG. 1 is a view illustrating one embodiment of a fishing rod according to the present invention. As illustrated in the drawing, a fishing rod 1 according to one embodiment of the present invention comprises a rod body 2, a reel R attached to the rod body 2 via a reel seat 9, and fishing line guides 10 attached to the rod body 2. In the illustrated embodiment, the reel seat 9 and each of the fishing line guides 10 correspond to attachment components attached to an outer peripheral surface of the rod body.

The rod body 2 is configured, for example, by connecting a base rod 3, a middle rod 5, a tip rod 7, and the like to each other. These rod bodies are jointed to each other, for example, by an ordinarily jointed type. The base rod 3, the middle rod 5, and the tip rod 7 can be jointed to each other by a telescopic type, an inversely jointed type, a socket-and-spigot jointed type, or any other known joined type. The rod body 2 may be formed of a single rod body.

Each of the base rod 3, the middle rod 5, and the tip rod 7 is formed by, for example, a tubular body made of a fiber-reinforced resin. The tubular body made of a fiber-reinforced resin is made by winding a fiber-reinforced resin prepreg (prepreg sheet), which is obtained by impregnating reinforcing fibers with a matrix resin, around a core metal and by heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. In addition, an outer surface of the tubular body is appropriately polished. Each of the rod bodies may be formed in a solid shape.

In the illustrated embodiment, the base rod 3, the middle rod 5, and the tip rod 7 is provided with a plurality of the fishing line guides 10 (fishing line guides 10A to 10D) that guide a fishing line paid out from a reel 6 mounted to the reel seat 9. More specifically, the base rod 3 is provided with the fishing line guide 10A, the middle rod 5 is provided with the fishing line guide 10B, and the tip rod 7 is provided with the fishing line guide 10C. The top guide 10D is provided at a distal end of the tip rod 7, and details will be omitted.

Next, a reel seat main body 12 and the reel seat 9 will be described with reference to FIG. 2. The reel seat 9 comprises the reel seat main body 12 having a reel leg placement surface 12a, on which a reel leg 6b of the fishing reel 6 is placed, in an axial direction thereof. The reel seat main body 12 is formed in a cylindrical shape as a whole. The reel seat main body 12 can be configured with, for example, a length of 60 to 160 mm, but is not limited thereto.

In addition, the reel seat main body 12 forms a grip portion 12b that slightly bulges opposite to the reel leg placement surface 12a, and that has a curved outer surface which is made easy to grip by supporting the thenar or the vicinity thereof when gripped with a gripping hand.

Figure 2:
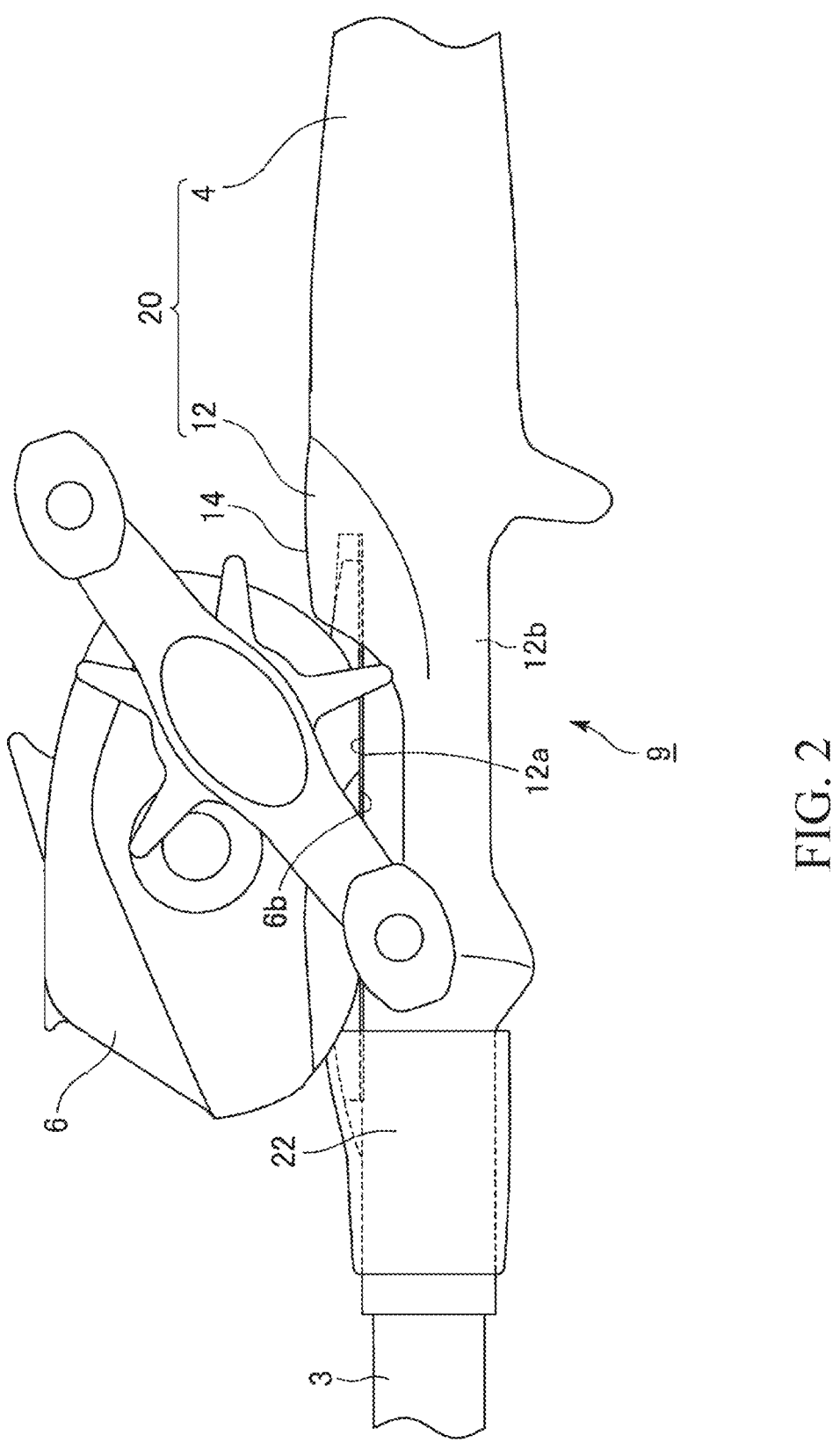
FIG. 2 is a view illustrating a fishing rod reel seat according to one embodiment of the present invention.

The reel leg placement surface 12a of the reel seat main body 12 can be formed flat or substantially flat with a larger curvature than other circumferential portions (for example, the grip portion 12b) adjacent to the reel leg placement surface 12a of the reel seat main body 12, and is formed to extend in the axial direction of the reel seat main body 12 illustrated in FIG. 2. The fixed hood 14 is integrally disposed at one end (rod base side) of the reel seat main body 12. One end of the reel leg placement surface 12a of the reel seat main body 12 is disposed inside the fixed hood 14.

A movable hood 22 is mounted to the other end (rod tip side) of the reel seat main body 12 so as to be movable in the axial direction. The reel seat main body 12 and the movable hood 22 may be collectively referred to as the reel seat 9, and details will be omitted.

Figure 3:
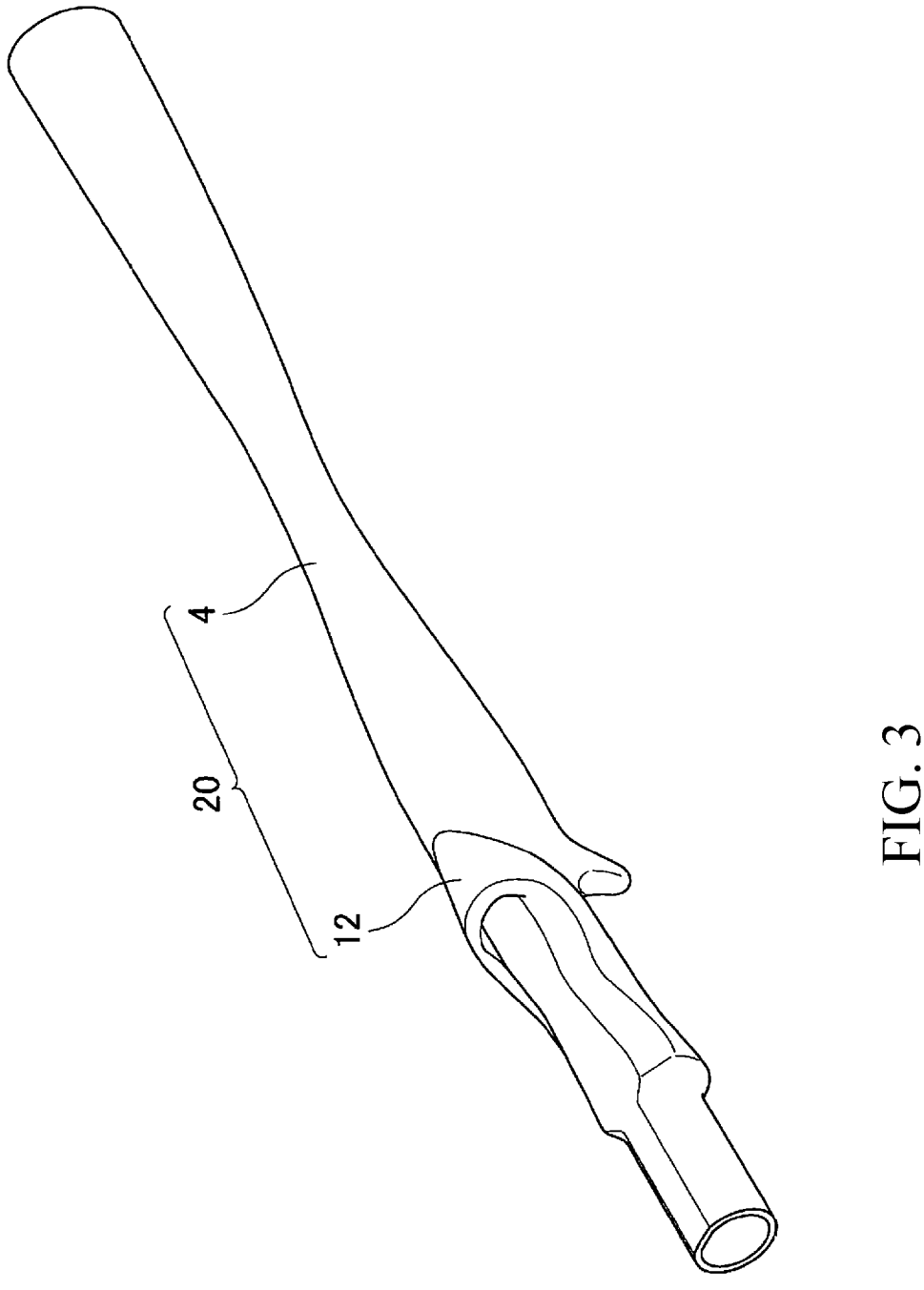
FIG. 3 is a view illustrating a fishing rod handle member according to one embodiment of the present invention.

Next, a fishing rod handle member 20 according to one embodiment of the present invention will be described with reference to FIG. 3 (and FIG. 2). Here, the fishing rod handle member 20 comprises the reel seat main body 12 described above and a grip 4 formed adjacent to the reel seat main body 12. Incidentally, the reel seat 9 described above and the grip 4 may be collectively referred to as the fishing rod handle member 20; however, in the present embodiment, the fishing rod handle member 20 is defined as described above.

As illustrated in the drawings, the fishing rod handle member 20 according to one embodiment of the present invention is configured such that the reel seat main body 12 in which the reel leg placement portion 12a on which the reel leg 6b is placed is formed and the grip 4 connected to the reel seat main body 12 are integrally molded.

Next, the fishing rod handle member 20 according to one embodiment of the present invention will be described with reference to FIGS. 4a, 4b, and 4c. FIG. 4b illustrates a cross-sectional view of a cross section A-A in FIG. 4a, and FIG. 4c illustrates a cross-sectional view of a cross section

5

Figure 4A:
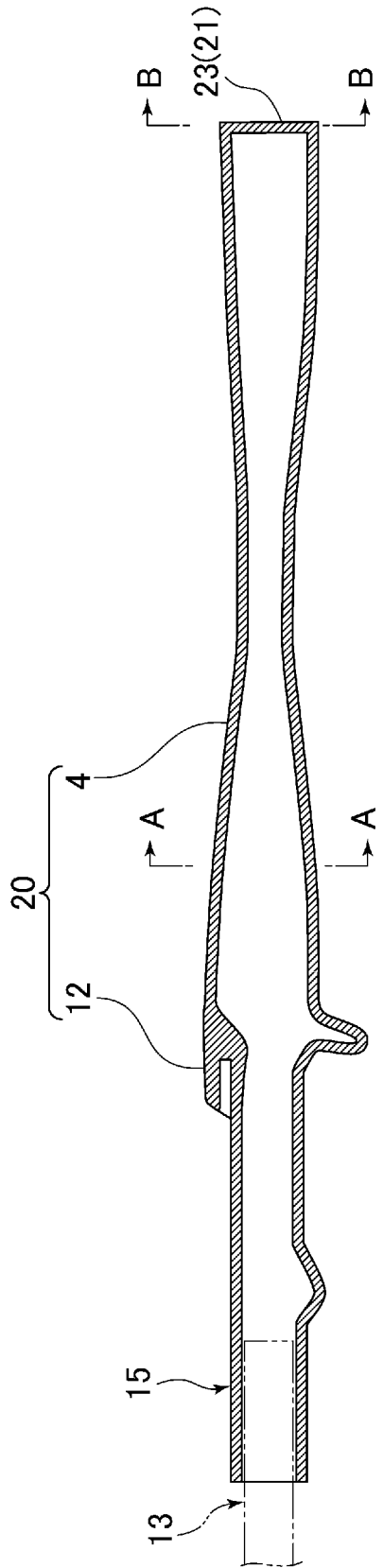
FIG. 4A is a view illustrating the fishing rod handle member according to one embodiment of the present invention.
Figure 4B:
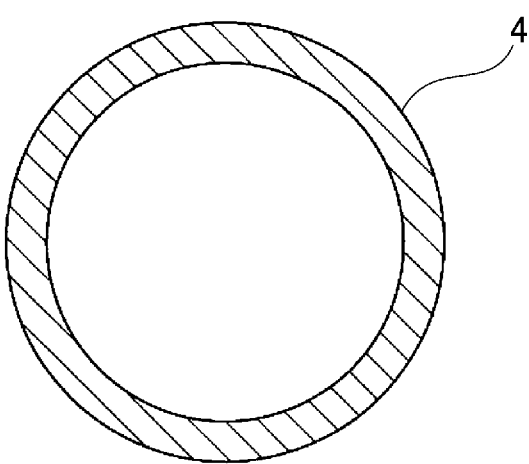
FIG. 4B is a view illustrating a cross section of the fishing rod handle member according to one embodiment of the present invention.
Figure 4C:
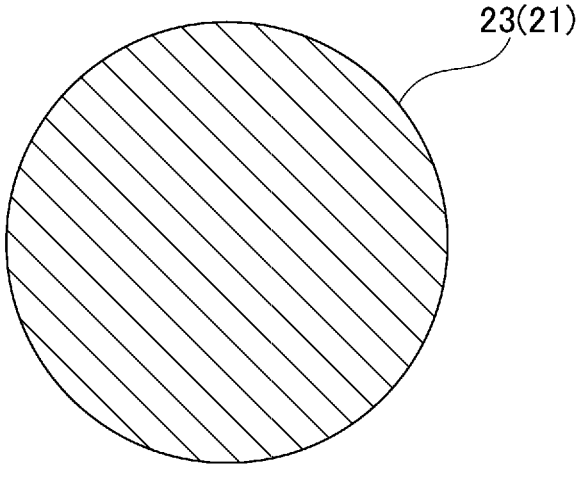
FIG. 4C is a view illustrating a cross section of the fishing rod handle member according to one embodiment of the present invention.

B-B in FIG. 4a. In the fishing rod handle member 20 according to one embodiment of the present invention, the reel seat main body 12 in which the reel leg placement portion 12a on which the reel leg 6b is placed is formed and the grip 4 connected to the reel seat main body 12 are integrally molded, and the grip 4 is connected to the reel seat main body 12 at one end, and has a closed structure 21 (refer to FIGS. 4a and 4c to be described later) at the other end. In addition, in the fishing rod handle member 20 according to one embodiment of the present invention, the closed structure 21 is a wall member 23 covering the other end of the grip 4. Incidentally, the wall member 23 can be formed to be perpendicular or substantially perpendicular to an extending direction of the grip, but is not limited thereto (the same applies throughout the present specification).

The wall member 23 forms a part of the grip 4, and the other end (end on an opposite side of the grip 4 from a side to which the reel seat main body 12 is connected) of the grip 4 has a closed structure (a structure in which the other end is closed from the outside) due to the wall member 23. Accordingly, it is not necessary to join a separate metal or resin component to the other end through adhesion or the like. On the other hand, in a case where the other end has a closed structure, it is not necessary to provide a separate component, and an adhesive agent or the like is not required, so that the grip comprising the closed structure can be integrally molded, and the grip can more uniformly resist an external force acting on the grip. Therefore, it is possible to reduce the thickness and weight while maintaining the strength. Since it is not necessary to provide a separate component, man-hours of the assembly work can be reduced.

According to the fishing rod handle member 20 of one embodiment of the present invention, it is possible to provide a fishing rod handle member comprising a fishing rod reel seat and a fishing rod grip, that is lightweight, that makes it difficult for vibration from the rod body to attenuate, and that can hold strength without reinforcing the end of the grip with a separate member.

Next, the fishing rod handle member 20 according to one embodiment of the present invention will be further described with reference to FIGS. 4a, 4b, and 4c. As illustrated in FIG. 4a, in the fishing rod handle member 20 according to one embodiment of the present invention, the inside of the fishing rod handle member can be formed in a hollow shape, and details will be described later. In the case of forming in a hollow shape, the weight can be significantly reduced without affecting sensitivity applied to the fishing rod.

In the fishing rod handle member 20 according to one embodiment of the present invention, the reel seat main body 12 and the grip 4 may be formed in a hollow shape except for one end (end on the rod tip side) of the reel seat main body 12 and the other end (end on a rod butt side) of the grip 4. In this manner, when portions that may not necessarily be formed in a solid shape are formed in a hollow shape, the weight can be significantly reduced without affecting sensitivity applied to the fishing rod. In addition, in the fishing rod handle member 20 according to one embodiment of the present invention, the reel seat main body 12 and the grip 4 may be formed in a hollow shape except for the other end (end on the rod butt side) of the grip 4. In this manner, one end (end on the rod tip side) of the reel seat main body 12 may have an open structure, so that the rod body can be inserted, and the other end (end on the rod butt side) of the grip 4 may have the closed structure 21.

In addition, in the fishing rod handle member 20 according to one embodiment of the present invention, the reel seat main body 12 and the grip 4 may be formed in a solid shape except for the one end (end on the rod tip side) of the reel seat main body 12. In this manner, the one end (end on the rod tip side) of the reel seat main body 12 is configured with an open structure, so that it is possible to form the grip that is easy to grip without affecting sensitivity applied to the fishing rod while allowing the rod body to be inserted. In addition, in the fishing rod handle member 20 according to one embodiment of the present invention, the reel seat main body 12 and the grip 4, also comprising the other end (end on the rod butt side) of the grip 4, may be formed in a solid shape. In this manner, even in the case of forming in a solid shape, it is possible to prevent sensitivity applied to the fishing rod from being affected while suppressing an increase in weight by using a low-specific gravity resin. Incidentally, in the case of forming in a solid shape, forming can be performed using a foam member or a low-specific gravity resin. Here, the low-specific gravity resin refers to a resin having a specific gravity of 1.2 or less, and as the low-specific gravity resin, for example, an epoxy material or a polypropylene (PP) material can be considered; however, the material is not limited thereto (the same applies throughout the present specification). In addition, the same material as that used to form the reel seat main body and the grip to be described later may be used. In a case where the materials forming the reel seat main body and the grip are the same, the reel seat main body, the grip, and the solid portion may be integrally formed.

In addition, in the fishing rod handle member 20 according to one embodiment of the present invention, a part of the reel seat main body 12 and the grip 4 may be formed in a solid shape and the other portion may be formed in a hollow shape except for the one end (end on the rod tip side) of the reel seat main body 12. In this manner, the one end (end on the rod tip side) of the reel seat main body 12 is configured with an open structure, so that it is possible to form the grip that is easy to grip without affecting sensitivity applied to the fishing rod while allowing the rod body to be inserted. In addition, in the fishing rod handle member 20 according to one embodiment of the present invention, a part of the reel seat main body 12 and the grip 4 may be formed in a solid shape and the other portion may be formed in a hollow shape except for the other end (end on the rod butt side) of the grip 4. In this manner, it is possible to form the grip that is easy to grip without affecting sensitivity applied to the fishing rod. Incidentally, the portion to be formed in a solid shape can be formed using a foam member or a low-specific gravity resin. In addition, the same material as that used to form the reel seat main body and the grip to be described later may be used. In a case where the material of the portion to be formed in a solid shape is the same as the material forming the reel seat main body and the grip, the reel seat main body, the grip, and the solid portion may be integrally formed.

In addition, in the fishing rod handle member 20 according to one embodiment of the present invention, the one end (end on the rod tip side) of the reel seat main body 12 may be formed in a hollow shape so as to attach an end of the fishing rod body 2. In addition, as illustrated in FIGS. 4a and 4b, in the fishing rod handle member 20 according to one embodiment of the present invention, an end 13 of the fishing rod body 2 is attached to one end 15 of the reel seat main body 12, which is the end 15 located opposite to the grip 4. In this manner, unlike many methods of the related art, since the rod body does not need to pass through the entirety or substantially the entirety of the fishing rod handle member 20, a significant reduction in weight can be achieved.

The fishing rod handle member 20 according to one embodiment of the present invention is configured such that the reel seat main body 12 and the grip 4, also comprising the closed structure 21 in which the wall member 23 is formed, is formed from carbon fiber-reinforced plastic (CFRP). In addition, the reel seat main body 12 and the grip 4 of the fishing rod handle member 20, also comprising the closed structure 21 in which the wall member 23 is formed, may be formed from a continuous fiber (CFRTP), a discontinuous fiber (CFRTP), or a hybrid thereof. By performing forming using such a material, in the handle member 20 having a closed structure which is used for the fishing rod, it is possible to suppress an increase in weight while ensuring sufficient rigidity or strength. In addition, in the fishing rod handle member according to one embodiment of the present invention, carbon fibers of the carbon fiber-reinforced plastic are continuously formed in a longitudinal direction of the fishing rod handle member, in a longitudinal direction of the grip, and along the closed structure. In this manner, the weight can be reduced by ensuring bending rigidity or vibration of the fishing rod caused by the hit of a fish can be sensitively transmitted to the hand. More specifically, all portions touched by an operator (user) are continuous and have an integral structure, and vibration input to the fishing rod main body can be efficiently transmitted to the end of the grip. In addition, in a case where the end of the grip has an open structure, for example, it is necessary to reinforce the end in a crushing direction using an aluminum component or a resin component, but by adopting a closed structure and using a carbon material, not only a reduction in weight can be achieved, but also high rigidity can be realized.

Figure 5:
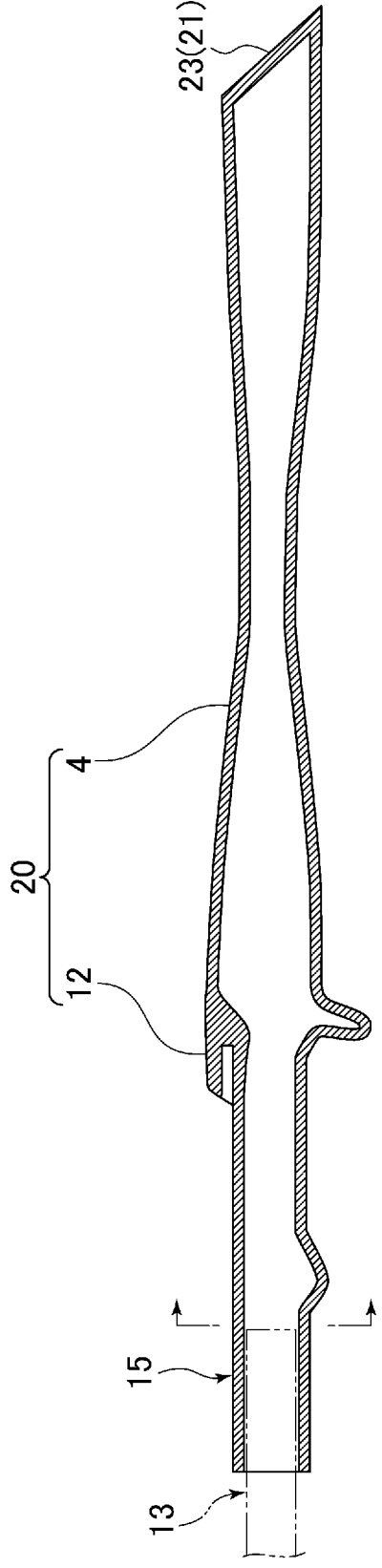
FIG. 5 is a view illustrating a fishing rod handle member according to one embodiment of the present invention.

Next, the fishing rod handle member 20 according to one embodiment of the present invention will be described with reference to FIG. 5. As illustrated in the drawing, in the fishing rod handle member 20 according to one embodiment of the present invention, the reel seat main body 12 in which the reel leg placement portion 12a on which the reel leg 6b is placed is formed and the grip 4 connected to the reel seat main body 12 are integrally molded, and the grip 4 is connected to the reel seat main body 12 at the one end, and has the closed structure 21 (the wall member 23 covering the other end of the grip 4) at the other end. The wall member 23 may be formed to be inclined with respect to the extending direction of the grip. In this manner, the rear end of the fishing rod can be easily held under the arm. Incidentally, the fact that the wall member 23 can be formed to be inclined with respect to the extending direction of the grip is same throughout the present specification.

Figure 6:
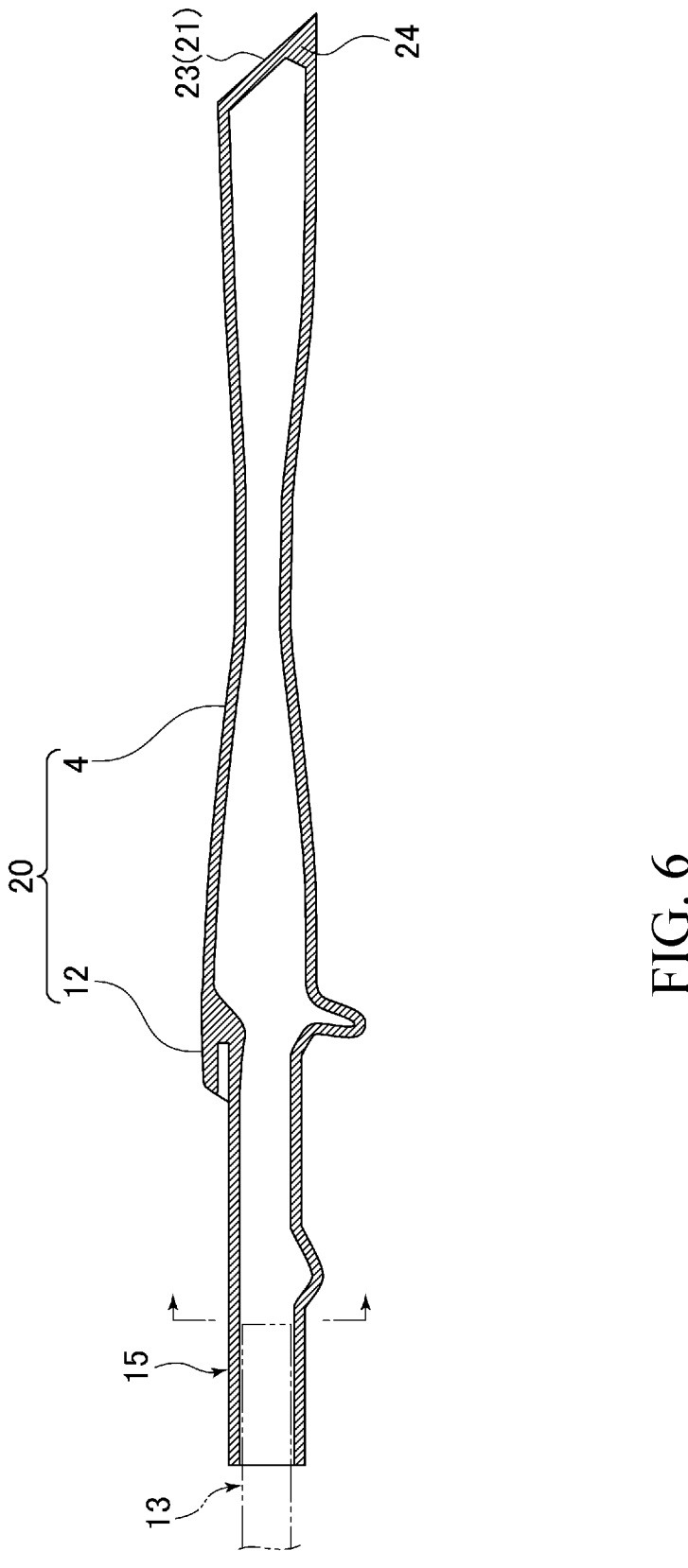
FIG. 6 is a view illustrating a fishing rod handle member according to one embodiment of the present invention.

Next, the fishing rod handle member 20 according to one embodiment of the present invention will be described with reference to FIG. 6. As illustrated in the drawing, in the fishing rod handle member 20 according to one embodiment of the present invention, the reel seat main body 12 in which the reel leg placement portion 12a on which the reel leg 6b is placed is formed and the grip 4 connected to the reel seat main body 12 are integrally molded, and the grip 4 is connected to the reel seat main body 12 at the one end, and has the closed structure 21 (the wall member 23 covering the other end of the grip 4) at the other end. The wall member 23 is formed to be inclined with respect to the extending direction of the grip, and comprises a thick portion 24, which is increased in thickness, at an end of the wall member 23. In this manner, the wall member (fiber-reinforced resin material) can be prevented from being cracked when the fishing rod is placed on the ground or the like. Incidentally, the thick portion 24 is applicable not only to the present embodiment but also to other embodiments in the present specification.

Figure 7:
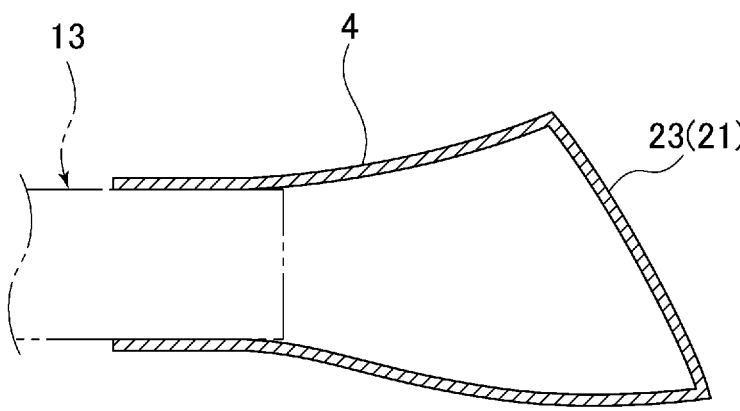
FIG. 7 is a view illustrating a fishing rod grip according to one embodiment of the present invention.

Next, a grip according to one embodiment of the present invention will be described with reference to FIG. 7. The grip according to one embodiment of the present invention is formed of only the grip 4 (namely, a mode in which the reel seat main body 12 is not provided) of the fishing rod handle member 20 according to one embodiment of the present invention, and other configurations are the same as those of the grip 4 described above. As illustrated in the drawing, the grip 4 according to one embodiment of the present invention is configured such that the end 13 of the fishing rod body 2 is connected to the one end and the other end has the closed structure 21 (the wall member 23 covering the other end of the grip 4), and the wall member 23 is formed to be inclined with respect to the extending direction of the grip. In this manner, the rear end of the fishing rod can be easily held under the arm.

In the grip 4 according to one embodiment of the present invention, the grip 4 may be in a hollow shape except for the other end (end on the rod butt side) of the grip 4. In this manner, the one end (end on the rod tip side) of the grip 4 can have an open structure, so that the rod body can be inserted, and the other end (end on the rod butt side) of the grip 4 can have the closed structure 21, and when a portion that may not necessarily be formed in a solid shape is formed in a hollow shape, the weight can be significantly reduced without affecting sensitivity applied to the fishing rod.

In addition, in the grip 4 according to one embodiment of the present invention, the grip 4 may be formed in a solid shape except for the one end (end on the rod tip side) of the grip 4. In this manner, the one end (end on the rod tip side) of the grip 4 is configured with an open structure, so that it is possible to form the grip that is easy to grip without affecting sensitivity applied to the fishing rod while allowing the rod body to be inserted. Incidentally, in the case of forming in a solid shape, forming can be performed using a foam member or a low-specific gravity resin. In addition, the same material as that used to form the grip described above may be used. In a case where the material is the same as the material forming the grip, the grip and the solid portion may be integrally formed.

In addition, in the grip 4 according to one embodiment of the present invention, a part of the grip 4 may be formed in a solid shape and the other portion may be formed in a hollow shape except for the one end (end on the rod tip side) and the other end (end on the rod butt side) of the grip 4. In this manner, the one end (end on the rod tip side) of the reel seat main body 12 is configured with an open structure, so that it is possible to form the grip that is easy to grip without affecting sensitivity applied to the fishing rod while allowing the rod body to be inserted. Incidentally, the portion to be formed in a solid shape can be formed using a foam member or a low-specific gravity resin. In addition, the same material as that used to form the grip described above may be used. In a case where the material of the portion to be formed in a solid shape is the same as the material forming the grip described above, the grip and the solid portion may be integrally formed.

Figure 8:
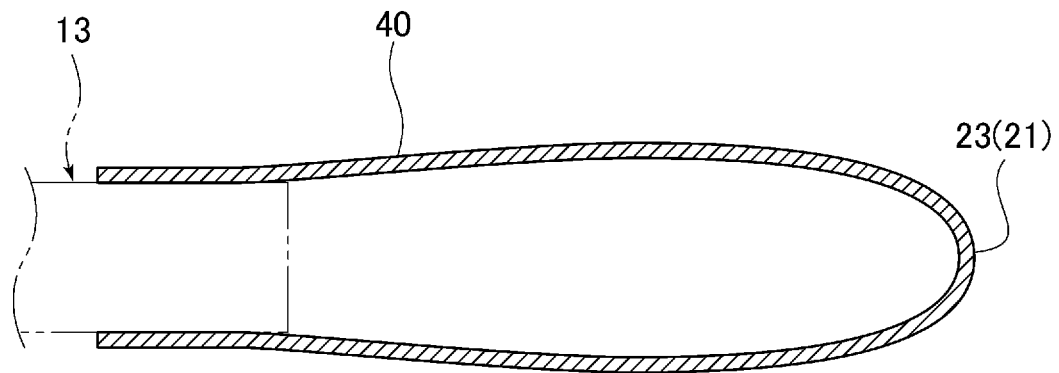
FIG. 8 is a view illustrating a hera rod grip according to one embodiment of the present invention.

Next, another grip (in the case of a hera rod grip) according to one embodiment of the present invention will be described with reference to FIG. 8. As illustrated in the drawing, a hera rod grip 40 according to one embodiment of the present invention is configured such that the end 13 of the fishing rod body 2 is connected to one end and the other end has the closed structure 21 (the wall member 23 covering the other end of the grip 4), and the wall member 23 is formed in a curved shape. In this manner, the crushing rigidity and strength of the end of the grip can be ensured without separately attaching a component.

The fishing rod 1 according to one embodiment of the present invention comprises one of the fishing rod handle member 20 and the grip 4 or the grip 40, and the rod body 2. According to the fishing rod 1 of one embodiment of the present invention, it is possible to provide a fishing rod comprising a fishing rod handle member or a grip, that is lightweight, that makes it difficult for vibration from the rod body to attenuate, and that can hold strength without reinforcing the end of the grip with a separate member. Here, as a method for attaching the end 13 of the fishing rod body 2 to the fishing rod handle member 20 or the grip 4 or 40, for example, fitting (press-fitting), adhesion, or fastening can be considered; however, the method is not limited thereto. The attachment methods provided here as examples have an advantage that the rod body and the handle member or the grip are more easily attached and detached from each other.

Figure 9A:
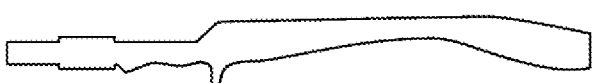
FIG. 9A-G are views illustrating a method for molding a fishing rod handle member according to one embodiment of the present invention.

Next, a method for molding the fishing rod handle member 20 according to one embodiment of the present invention will be described with reference to FIG. 9. First, as illustrated in FIG. 9a, the dimensions and shape of a core member (for example, offset inward from the fishing rod handle member 20 by approximately 0.5 to 1 mm) are determined to conform to the shape and dimensions of the fishing rod handle member 20, and the core member that is soluble is fabricated (the fabrication of the core member). As a method for fabricating the core member, injection molding, casting, forming by a 3D printer, and the like can be considered; however, the method is not limited thereto. Incidentally, a surface layer of the core member is covered with a non-soluble resin.

Figure 9B:
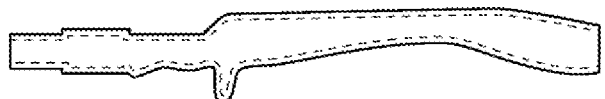

Next, as illustrated in FIG. 9b, a prepreg is laminated around the core member to form a preform. Here, as the material to be laminated, a dry carbon fiber base material that is not impregnated with resin may be used.

Figure 9C:
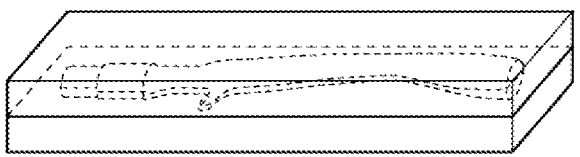

Then, as illustrated in FIG. 9c, the preform is put in a mold, and press molding is performed by heating and pressurizing the preform. Incidentally, autoclaving, RTM molding, or the like may be used; however, the process is not limited to a specific mode.

Figure 9D:

Next, as illustrated in FIG. 9d, secondary processing (dimensioning and deburring) is performed on a molded product. More specifically, excess portions of the front and rear of the molded product and burrs generated during molding are removed. Thereafter, the molded product subjected to the secondary processing is put in water, warm water, or the like to dissolve the core member inside the molded product. In this manner, the fishing rod handle member 20 is formed.

Figure 9E:
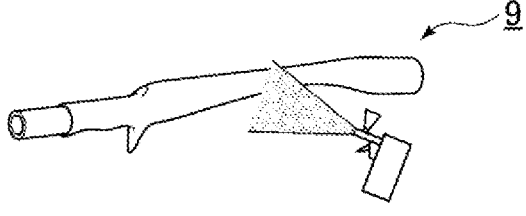
Figure 9F:
Figure 9G:

Next, as illustrated in FIG. 9e, painting or printing is performed on an outer surface of the fishing rod handle member 20 as appropriate. Then, as illustrated in FIG. 9f, components and the like for attaching a reel are mounted. Finally, as illustrated in FIG. 9g, the reel can be placed and fixed to the fishing rod handle member 20. In this manner, the fishing rod handle member 20 according to one embodiment of the present invention, namely, the fishing rod handle member 20 which comprises a grip portion and in which the reel seat main body 12 in which the reel leg placement portion 12a on which the reel leg 6b is placed is formed and the grip 4 connected to the reel seat main body 12 are integrally molded is formed.

In this manner, according to the fishing rod handle member 20 of one embodiment of the present invention, since gripability can be greatly improved, a significant reduction in weight can be realized by integrally forming the handle member, and the attenuation of vibration from the rod body can be reduced due to integral molding, it is possible to form the fishing rod handle member 20 comprising the reel seat main body 12 and the fishing rod grip 4, and capable of improving the sensitivity of the fishing rod and holding strength without reinforcing the end of the grip with a separate member.

Next, another method for molding the fishing rod handle member 20 according to one embodiment of the present invention will be described. First, the dimensions and shape of a core member (for example, offset inward from the fishing rod handle member 20 by approximately 0.5 to 1 mm) are determined to conform to the shape and dimensions of the fishing rod handle member 20 (the design of the core member). The core member (two half-split core members) conforming to the dimensions and shape of the core member is formed using PVA by a 3D printer. The two half-split core members are caused to adhere to each other to assemble the core member.

Next, a carbon fiber-reinforced plastic (CFRP) preform is formed around the core member (RTM molding, AC molding, VaRTM molding, F/M molding, S/W molding, I/P molding, or the like). The preform is cured by being subjected to taping or bagging (heat processing is performed at 80° C. or higher). Thereafter, the core member is dissolved in water (warm water or running water). Finally, a molded product is subjected to trimming, painting, or the like to form the fishing rod handle member 20.

According to the fishing rod handle member 20 of one embodiment of the present invention formed in this manner, since a structure capable of holding strength without reinforcing the end of the grip with a separate member can be formed, a significant reduction in weight can be realized by integrally forming the handle member, and the attenuation of vibration from the rod body can be reduced due to integral molding, the sensitivity of the fishing rod can be improved.

Next, another method for molding the fishing rod handle member 20 according to one embodiment of the present invention will be described. First, the dimensions and shape of a core member (for example, offset inward from the fishing rod handle member 20 by approximately 0.5 to 1 mm) are determined to conform to the shape and dimensions of the fishing rod handle member 20 (the design of the core member). A sand mold core member conforming to the dimensions and shape of the core member is formed using water-soluble sand.

Next, a preform is formed around the core member using carbon that is not impregnated with resin. Specifically, a cloth material (woven fabric), a non-crimp fabric (NCF), a braid, and a UD tape can be used; however, the material is not limited thereto. In addition, carbon fibers need to be shaped in the core member, and at this time, a binder is used to impart tackiness. As the types of the binder, epoxy, rosin, polyamide, polyphenylene sulfide, polyetherimide, polyethersulfone, polysulfone, polyphenylene ether, polyimide, polyamideimide, and phenoxy can be considered; however, the binder is not limited thereto. Here, in the above example, the case where carbon that is not impregnated with resin is used has been described; however, a method in which a prepreg in which a carbon cloth or the like is impregnated with resin in advance is directly laminated and disposed around a core using a hand layup method or the like and molding (curing) is performed may be adopted. The preform is set in a mold, and a resin is injected thereinto (RTM molding method). Thereafter, the sand mold core member is removed in water. Finally, a molded product is subjected to deburring, polishing, painting, and the like to form the fishing rod handle member 20.

Such an RTM molding method has an advantage that even in a complicated shape such as the shape of a handle, a portion that is not impregnated with resin, such as a resin withering or a void, can be avoided as much as possible by the manufacturing method of pouring a low-viscosity resin. In addition, since a material having better shapability than a prepreg can be used, even when a complicated shape is molded, fibers can be shaped without being subjected to a load more than necessary. Furthermore, since the outside is formed by the mold and the inside is formed from the core material, there is an advantage that both the outside and the inside can be molded with desired dimensions and a molded product having a good surface state both externally and internally can be produced. As described above, in the RTM molding method, the quality can be stabilized or an insufficiency in strength can be avoided.

Next, another method for molding the fishing rod handle member 20 according to one embodiment of the present invention will be briefly described. First, a mold formed to conform to the shape and dimensions of the fishing rod handle member 20 is prepared. A prepreg is put in the mold as a preform, and is pressed against an outer mold inside the mold by a pneumatic force (internal pressure molding) to form a molded product. Thereafter, the molded product is subjected to deburring, polishing, painting, and the like to form the fishing rod handle member 20. In such an internal pressure molding method, since the prepreg is pressed against the mold (outer mold) by internal pressure to be molded, an outer surface of the molded product can be more favorably molded. In addition, by using the prepreg, a molded product with a relatively small amount of resin can be manufactured, so that the weight of the product can be reduced.

Incidentally, the methods for molding the fishing rod handle member 20 according to one embodiment of the present invention described above are also applicable to both the grip 4 according to one embodiment of the present invention and the grip 40 according to one embodiment of the present invention described above, and exhibits the technical effects described above.

The dimensions, material, and disposition of each component described in the present specification are not limited to those explicitly described in the embodiments, and each component can be modified to have any dimensions, material, and disposition that are within the scope of the present invention. In addition, components that are not explicitly described in the present specification can also be added to the described embodiments, or some of the components described in each embodiment can also be omitted.

REFERENCE SIGNS LIST

1 Fishing rod
2 Rod body

3 Base rod
4 Grip
5 Middle rod
6 Reel
6*b* Reel leg
7 Tip rod
9 Reel seat
10 Fishing line guide
12 Reel seat main body
12*a* Reel leg placement surface
13 End
14 Fixed hood
15 End
20 Fishing rod handle member
21 Closed structure
22 Movable hood
23 Wall member
24 Thick portion
40 Hera rod grip

The invention claimed is:

1. A fishing rod handle member comprising:
a reel seat main body including a reel leg placement portion configured to receive a reel leg, and
a grip integrally molded with the reel seat main body, wherein
the grip is continuous with the reel seat main body at one end of the grip, and has a closed structure at a second, opposite end of the grip,
the reel seat main body and the grip are hollow except for the closed structure, and
the fishing rod handle member is configured for an end of a fishing rod body to be attached to the reel seat main body only at an end of the reel seat main body that is opposite to the grip.

2. The fishing rod handle member according to claim 1, wherein the closed structure is a wall covering the second end of the grip.

3. The fishing rod handle member according to claim 2, wherein the wall is perpendicular or inclined with respect to an extending direction of the grip.

4. The fishing rod handle member according to claim 1, wherein the reel seat main body and the grip are formed from carbon fiber-reinforced plastic.

5. The fishing rod handle member according to claim 4, wherein carbon fibers of the carbon fiber-reinforced plastic are continuous in a longitudinal direction of the fishing rod handle member and along the closed structure.

6. The fishing rod handle member according to claim 1, wherein the one end of the reel seat main body is a hollow shape configured to receive to the end of the fishing rod body.

7. A fishing rod comprising: the fishing rod handle member according to claim 1; and a rod body.

8. The fishing rod handle member according to claim 1, wherein the reel seat main body and the grip are not filled with a fishing rod body.

* * * * *